United States Patent
McKelvey

(10) Patent No.: US 10,453,003 B2
(45) Date of Patent: Oct. 22, 2019

(54) DIGITAL RIGHTS MANAGEMENT LICENSE IDENTIFICATION

(75) Inventor: Alexander McKelvey, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1923 days.

(21) Appl. No.: 12/233,456

(22) Filed: Sep. 18, 2008

(65) Prior Publication Data

US 2010/0070416 A1   Mar. 18, 2010

(51) Int. Cl.
*G06Q 10/06* (2012.01)
*G06Q 50/18* (2012.01)

(52) U.S. Cl.
CPC ........... *G06Q 10/06* (2013.01); *G06Q 50/18* (2013.01)

(58) Field of Classification Search
CPC ...................................... G06F 21/10
USPC ................................... 705/59, 57
See application file for complete search history.

(56) References Cited

U.S. PATENT DOCUMENTS

| | | | |
|---|---|---|---|
| 5,287,408 A * | 2/1994 | Samson | 705/59 |
| 5,390,297 A | 2/1995 | Barber et al. | |
| 5,553,143 A | 9/1996 | Ross et al. | |
| 5,754,659 A * | 5/1998 | Sprunk et al. | 380/30 |
| 5,995,625 A * | 11/1999 | Sudia et al. | 705/51 |
| 6,023,509 A | 2/2000 | Herbert et al. | |
| 6,772,342 B1 * | 8/2004 | Hawthorne | 713/176 |
| 7,024,562 B1 * | 4/2006 | Flink et al. | 713/186 |
| 7,076,468 B2 * | 7/2006 | Hillegass et al. | 705/56 |
| 7,363,318 B1 * | 4/2008 | Dere | G06F 21/105 |
| 7,376,624 B2 * | 5/2008 | Cochran et al. | 705/53 |
| 7,380,280 B2 | 5/2008 | De Jong | |
| 7,464,058 B2 * | 12/2008 | Yen et al. | 705/59 |
| 7,711,952 B2 * | 5/2010 | Teal et al. | 713/156 |
| 8,196,208 B2 * | 6/2012 | Kim et al. | 726/26 |
| 8,832,466 B1 * | 9/2014 | McGregor, Jr. | H04L 9/0836 380/37 |
| 2004/0039594 A1 * | 2/2004 | Narasimhan et al. | 705/1 |
| 2004/0162846 A1 | 8/2004 | Nakahara et al. | |
| 2005/0262034 A1 | 11/2005 | Carro | |
| 2006/0064582 A1 | 3/2006 | Teal et al. | |
| 2006/0075001 A1 * | 4/2006 | Canning | G06F 8/65 |
| 2006/0107056 A1 * | 5/2006 | Bhatt et al. | 713/176 |
| 2006/0168451 A1 * | 7/2006 | Ishibashi | G06F 21/10 713/176 |

(Continued)

OTHER PUBLICATIONS

"Generate License Key (QLZAGENK) API", (Retrieved Jun. 23, 2008), http://publib.boulder.ibm.com/infocenter/iseries/v5r3/index.jsp?topic=/apis/qlzagenk.htm.

(Continued)

*Primary Examiner* — Alexis M Casey
(74) *Attorney, Agent, or Firm* — Alleman Hall Creasman & Tuttle LLP

(57) ABSTRACT

A digital rights management license provides access to a content key that can be used to decrypt an encrypted digital content item. The digital rights management license also includes a policy that defines circumstances in which the content key is allowed to decrypt the encrypted digital content item. Further, the digital rights management license includes a license identifier. The license identifier is a digital fingerprint of at least a portion of the policy of the license.

14 Claims, 2 Drawing Sheets

(56) References Cited

U.S. PATENT DOCUMENTS

| | | |
|---|---|---|
| 2007/0100701 A1* | 5/2007 | Boccon-Gibod et al. ...... 705/21 |
| 2007/0266441 A1 | 11/2007 | Kim et al. |
| 2008/0027870 A1 | 1/2008 | Nam et al. |
| 2008/0044017 A1* | 2/2008 | Nakano et al. ............... 380/201 |
| 2008/0313741 A1* | 12/2008 | Alve et al. ...................... 726/26 |
| 2009/0208016 A1* | 8/2009 | Choi et al. .................... 380/277 |
| 2009/0265561 A1* | 10/2009 | Bromley et al. .............. 713/189 |
| 2010/0057703 A1* | 3/2010 | Brandt .................... G06F 21/10 707/E17.014 |

OTHER PUBLICATIONS

"Globally Unique Identifiers", (Retrieved Jun. 23, 2008), http://www.ostyn.com/standards/docs/guids.htm.

\* cited by examiner

DIGITAL RIGHTS MANAGEMENT LICENSE IDENTIFICATION

BACKGROUND

Digital content has become ubiquitous. Music, video, textual works, graphical works, games, and countless other types of content are saved in various digital formats. While digital formats offer many benefits, the ease with which exact duplicates can be made poses some challenges. In particular, because digital duplicates can be made without losing any quality and/or fidelity, it can be difficult to prevent the unauthorized copying and distribution of digital content.

SUMMARY

A digital rights management license is disclosed. The digital rights management license provides access to a content key that can be used to decrypt an encrypted digital content item. The digital rights management license also includes a policy that defines circumstances in which the content key is allowed to decrypt the encrypted digital content item. Further, the digital rights management license includes a license identifier. The license identifier is a digital fingerprint of at least a portion of the policy of the license.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to digital rights management and licenses that are used to help implement digital rights management. In order to limit the unauthorized distribution and use of digital content, digital content may be encrypted with a cryptographic content key so that it can be used only if decrypted with a corresponding symmetric cryptographic content key. The content key that can decrypt a particular digital content item may itself be encrypted with a public cryptographic key that corresponds to a private cryptographic key that is issued to a particular user, device, domain, or other limited sample of potential content consumers. In this way, only the content consumers having access to an appropriate private cryptographic key may decrypt the cryptographic content key and thereby decrypt the encrypted digital content item.

Figure 1:
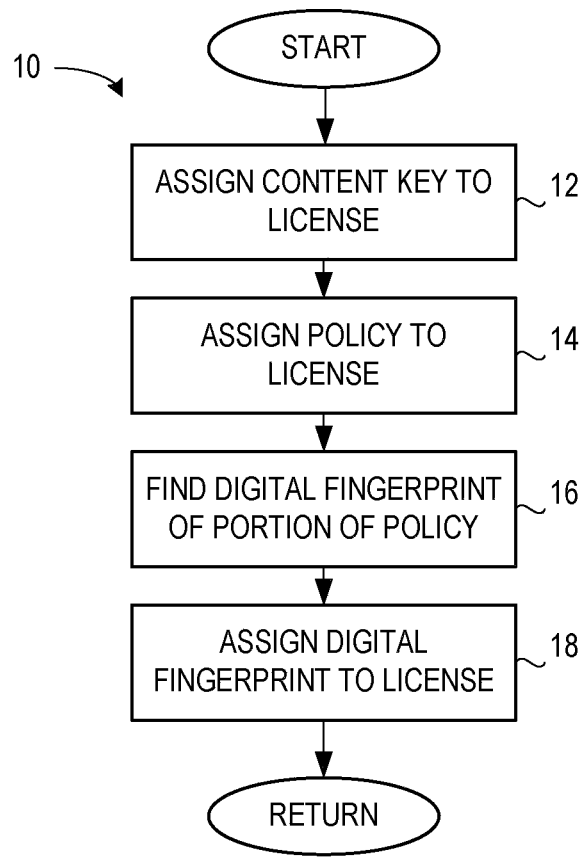
FIG. 1 shows a process flow of an example method of building a license for implementing digital rights management.

FIG. 1 shows a process flow of an example method 10 of building a license for implementing digital rights management. At 12, method 10 includes assigning a content key to the license. The content key assigned to the license can be configured to decrypt content data encrypted by a symmetric cryptographic content key. The content key may itself be encrypted with a public key so that only a device with a corresponding symmetric private key can decrypt the content key and thereby decrypt the content data. Alternatively, the content key may itself be encrypted with a public key so that only a device belonging to a domain having access to a corresponding symmetric private key can decrypt the content key and thereby decrypt the content data.

At 14, method 10 includes assigning a policy to the license. The policy assigned to the license may define circumstances in which the content key is allowed to decrypt content data encrypted by the symmetric cryptographic content key.

For example, the policy may include an indication of the content data to which the license applies. The license may apply to a particular audio file, video file, document, game, ringtone, or virtually any other digital data. The policy may set forth which digital data is covered by the license.

The policy may additionally or alternatively include an indication of when the license expires. The license may be set to expire at a specified date, after a specified number of times the digital content is opened or copied, after a specified duration that the digital content is used, or according to any other suitable schedule.

The policy may additionally or alternatively include an indication of to whom the license is issued. The license may be issued to a particular user, to a domain that may include one or more users allowed to access the licensed digital content on one or more different devices, to a particular device, or to any other suitable set of content consumers.

The policy may additionally or alternatively include an indication of what types of rights are granted by the license. As nonlimiting examples, the policy may indicate whether the license allows playback of a particular digital content item, whether the license allows copying of a particular digital content item, whether the license allows execution of DRM encrypted software, and/or whether the license provides a ringtone right that grants permission to play media in response to an incoming call.

The policy may also include information, instructions, and/or logic other than that described above.

At 16, method 10 includes finding a digital fingerprint of a portion of the policy. A variety of different techniques may be used to find the digital fingerprint of that portion of the policy. The digital fingerprint should have a unique correspondence to the portion of the policy from which it is generated in that other licenses having the same policy will yield the same digital fingerprint, whereas other licenses having different policies will yield different digital fingerprints.

In some embodiments, the digital fingerprint may be found by applying a deterministic sequence of finite instructions to a portion of the policy. As a nonlimiting example, the relevant portion of the policy may be input into a hash function, which may output a digital fingerprint including a fixed-length string.

In some embodiments, one or more portions of the policy may be ignored when finding the digital fingerprint. For example, any portions of the policy that do not ultimately change the rights granted by the license may be ignored. As a nonlimiting example, the policy may include a time and date the license was issued, and such information may be ignored when finding the digital fingerprint.

At 18, method 10 includes assigning the digital fingerprint to the license. The digital fingerprint may be assigned to the license as an identifier for the license. Because the digital fingerprint is the same for all licenses having the same policy, all licenses having the same policy will have the same license identifier. Accordingly, it is very easy to identify when two or more licenses are the same, because both licenses will have the same license identifier.

This is in direct contrast to other license naming conventions in which two or more licenses may grant the same rights (i.e., have the same policy), but have different license identifiers. For example, an alternative license naming strategy may be to use a Globally Unique Identifier (GUID) every time a license is created. However, such a strategy would result in a first license having a different license identifier than a second license having the same policy, even if the second license is created only moments after the first license.

Ensuring that licenses having the same policy also have the same license identifier makes it much easier to avoid issuing superfluous licenses to a particular user, device, domain, or other set of content consumers.

However, in some scenarios, the identifier assigned to a license may be randomized. For example, a license identifier may be randomized if the license grants consumable and/or cumulative rights (e.g., play counts). Although the actual policy for two licenses may be the same (e.g., both allow 5 play counts), combining the licenses is effectively a new policy (e.g., the licenses collectively allow 10 play counts). Therefore, in such circumstances, a user has extra rights by having both licenses, and each license can have different license identifiers.

Method 10 may further include assigning a content key identifier to the license. The content key identifier assigned to a license may identify which content key is assigned to the license. Digital content items may also include a content key identifier that indicates which content key is needed to decrypt that digital content item. In this way, the content key identifier from the digital content item can be matched to a content key identifier from one or more licenses in order to find which licenses apply to that digital content item.

Figure 2:
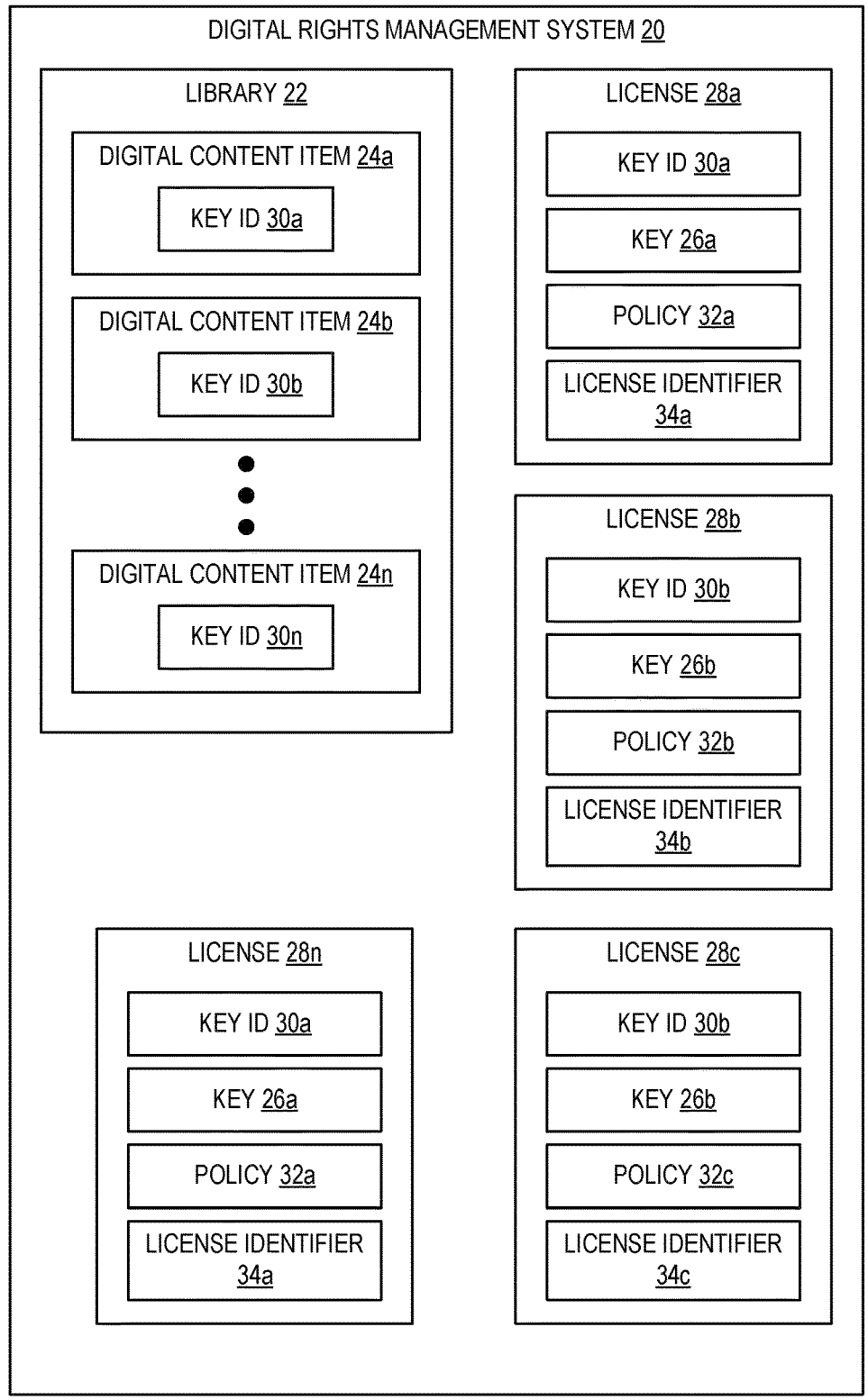
FIG. 2 schematically shows a digital rights management system in accordance with an embodiment of the present disclosure.

FIG. 2 schematically shows a digital content management system 20 in accordance with an embodiment of the present disclosure. The digital content management system includes a library 22 of encrypted digital content items (e.g., digital content item 24a, digital content item 24b, and digital content item 24n). Library 22 may include virtually any number of digital content items, and the digital content items included in library 22 may be virtually any different type of digital content items.

As discussed above, the digital content items may be encrypted so as to deter the unauthorized distribution and use of the digital content items. As such, for each encrypted digital content item, digital content management system 20 may include content keys configured to decrypt the encrypted digital content items. As shown in FIG. 2, such content keys (e.g., content key 26a and content key 26b) may be assigned to licenses (e.g., license 28a, license 28b, license 28c, and license 28n) that correspond to particular content items.

The digital content items and the licenses may both include content key identifiers (e.g., content key identifier 30a and content key identifier 30b) that allow licenses to be matched to corresponding content items. In the illustrated embodiment, license 28a and license 28n both correspond to content item 24a, as shown by matching content key identifier 30a; and license 28b and license 28c both correspond to content item 24b, as shown by matching content key identifier 30b.

As discussed above, each license may also include a policy (e.g., policy 32a, policy 32b, and policy 32c). The policy can define circumstances in which a particular one of the one or more content keys is allowed to decrypt an encrypted digital content item, as discussed above. Licenses that apply to different digital content items should have different policies (e.g., policy 32a and policy 32b), while licenses that apply to the same digital content items may have the same policy (e.g., policy 32a from license 28a and policy 32a from license 28n), or different policies (e.g., policy 32b from license 28b and policy 32c from license 28c). In other words, two or more licenses may exist with the same policies, and/or two or more licenses may exist for the same digital content items although such licenses have different policies.

Finally, each license may also include a license identifier (e.g., license identifier 34a, license identifier 34b, and license identifier 34c). The license identifier is a digital fingerprint of a portion of the policy for that license, and thus all licenses having the same relevant policy portions will have the same license identifiers (e.g., license identifier 34a from license 28a and license identifier 34a from license 28n).

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-implemented method of building a digital license for digital rights management executed on an electronic device, the method comprising:
    assigning a decryption content key to the digital license, the electronic device requiring the decryption content key to decrypt content data encrypted by a symmetric encryption cryptographic content key;
    assigning a policy in the digital license, the policy including a first portion not affecting rights granted by the policy and a second portion defining circumstances in which the decryption content key is allowed to decrypt the content data, the second portion including indication of when the digital license expires;
    applying a deterministic sequence of instructions to the second portion of the policy to return a digital fingerprint based on the second portion of the policy but ignoring the first portion of the policy; and
    assigning the digital fingerprint to the digital license as an identifier for the digital license.

2. The method of claim 1, where the deterministic sequence of instructions includes a hash function.

3. The method of claim 1, where the deterministic sequence of instructions returns a fixed-length string.

4. The method of claim 1, where the policy includes an indication of the content data to which the digital license applies.

5. The method of claim 1, where the policy includes an indication of to whom the digital license is issued.

6. The method of claim 1, where the policy includes an indication of whether the digital license allows playback.

7. The method of claim 1, where the policy includes an indication of whether the digital license allows copying.

8. The method of claim 1, where the decryption content key is itself encrypted with a public key so that only an electronic device with a corresponding symmetric private key can decrypt the decryption content key and thereby decrypt the content data.

9. The method of claim 1, where the decryption content key is itself encrypted with a public key so that only an electronic device belonging to a domain having access to a corresponding symmetric private key can decrypt the decryption content key and thereby decrypt the content data.

10. The method of claim 1, further comprising assigning a content key identifier to the digital license, the content key identifier identifying which content key is assigned to the digital license.

11. A computer-implemented method of building a digital license for digital rights management executed on an electronic device, the method comprising:

assigning a decryption content key to the digital license, the electronic device requiring the decryption content key to decrypt content data encrypted by a symmetric encryption cryptographic content key;

assigning a policy in the digital license, the policy including a first portion not affecting rights grated by the policy and a second portion defining circumstances in which the decryption content key is allowed to decrypt the content data, the second portion including indication of when the digital license expires;

applying a hash function to the second portion of the policy to return a digital fingerprint based on the second portion of the policy but ignoring the first portion of the policy; and assigning the digital fingerprint of the portion of the policy to the digital license as an identifier for the digital license.

12. The method of claim 11 wherein the first portion of the policy includes a date of issuance of the policy.

13. A computer-implemented method of building a digital license for digital rights management executed on an electronic device, the method comprising:

assigning a decryption content key to the digital license, the electronic device requiring the decryption content key to decrypt content data encrypted by a symmetric encryption cryptographic content key;

assigning a policy in the digital license, the policy including a first portion not affecting rights granted by the policy and a second portion defining circumstances in which the decryption content key is allowed to decrypt the content data, the second portion including indication of when the digital license expires;

applying a hash function to the second portion of the policy to return a digital fingerprint based on the second portion of the policy but ignoring the first portion of the policy;

assigning the digital fingerprint to the digital license as an identifier for the digital license; and randomizing the identifier for the digital license responsive to the second portion of the policy granting consumable, cumulative rights.

14. The method of claim 13 wherein the consumable, cumulative rights include a play count for the content data.

\* \* \* \* \*